Jan. 8, 1963 H. W. FULLER 3,072,893

DATA HANDLING TECHNIQUES

Filed March 4, 1957 2 Sheets-Sheet 1

INVENTOR
HARRISON W. FULLER

BY Fred Jacob
ATTORNEY

Jan. 8, 1963 H. W. FULLER 3,072,893

DATA HANDLING TECHNIQUES

Filed March 4, 1957 2 Sheets-Sheet 2

INVENTOR
HARRISON W. FULLER
BY Fred Jacob
ATTORNEY

United States Patent Office 3,072,893

Patented Jan. 8, 1963

3,072,893

DATA HANDLING TECHNIQUES

Harrison W. Fuller, Needham Heights, Mass., assignor, by mesne assignments, to Laboratory For Electronics, Inc., Boston, Mass., a corporation of Delaware Filed Mar. 4, 1957, Ser. No. 643,723
2 Claims. (Cl. 340—174.1)

The present invention relates in general to new and improved methods for handling data in computer systems and means for implementing these methods. In computer systems employing a binary system of notation, data is encoded in the form of binary digits comprising ONE's and ZERO's. These digits are commonly represented by means of electrical pulses. Data is stored magnetically by applying ONE and ZERO pulses to a magnetic storage medium, opposite pulses producing oppositely oriented magnetized areas in said medium. Data readout from the medium generally occurs by means of a magnetic head positioned in close proximity thereto, wherein the head senses the magnetized area under it and produces a responsive signal. In high density magnetic data storage systems having a storage capacity of the order of 1000 binary digits (or bits) per inch, data readout presents a problem due to the close proximity and partial overlap of the magnetized areas in the magnetic medium. Where adjacent areas have the same magnetic orientation, e.g. where they represent a sequence of binary ONE's, the partial overlap of successive areas produces a cumulative result. During readout, the succession of two or more like binary digits appears roughly as an extended signal of the same polarity having a varying amplitude. The low frequency response of the preamplifier which is directly connected to the readout head of the data storage medum, should preferably be sufficient to handle the lowest important frequency component related to the maximum number of successive like binary digits recorded in the magnetic medium. On the other hand, the preamplifier must be capable of recovering in a reasonably short time from an overloading transient, e.g. one occasioned by a writing signal, or by head selection. Additionally, where a self-clocked readout system is employed, for example, a system of the type referred to in U.S. Patent No. 2,976,517 to Harrison W. Fuller et al. entitled "Data Readout System," the maximum number of successive like binary digits stored in the magnetic medium must be limited in accordance with the precision economically obtainable in the equipment used. Specifically, in the self-clocked readout system referred to above, a crossover pulse is produced every time there is a polarity reversal of the waveform read out from the magnetic medium. Each bit is read out of storage by means of a clock pulse derived from a crossover pulse, said clock pulse sampling the waveform to obtain a readout signal. If, due to a high density succession of like binary digits, there is an absence of a crossover pulse which will give rise to a clock pulse, the previous clock pulse is recirculated. In the self-clocked readout system referred to above, this is instrumented by delaying the clock pulse for one bit period and then recirculating it. This process is repeated until a newly generated clock pulse takes its place. Since the aforesaid delay of one bit period may vary within the limits of precision of the pulse delay equipment, the cumulative phasing error which occurs if the recirculation of the same clock pulse is continued too long, could ultimately give rise to the loss of a bit during readout.

In the binary system of notation, each unit of data, e.g. each data word, is made up of data characters. Each data character is represented by means of bits, comprising ZERO's and ONE's. Normally, every character is checked by means of a check bit or otherwise. Generally speaking, it is economical to limit the number of bits which are used to form a data character in order to limit the amount of the required data processing equipment. Additionally, by keeping data characters small, space is conserved in the magnetic storage medium. Accordingly, where the number of data characters used in a given system is fixed, that binary code is used which embodies the least number of bits to represent each data character uniquely. This is true unless other considerations, such as the reliability of data readout, take precedence. The problem is primarily one of obtaining reliable data readout with high density data storage capacity, while using the minimum amount of necessary data processing equipment. To this end, the present invention employs separate binary digital codes for data storage and for data processing respectively, in order to represent data characters in different parts of the data processing system.

Accordingly, it is a primary object of this invention to provide a data processing system employing data handling techniques wherein reliable data readout from high density magnetic data storage media is obtained.

It is another object of this invention to provide a data processing system employing data handling techniques wherein high density data storage coupled with reliable data readout is obtained by using a binary data storage code which is different from the binary data processing code employed.

It is an additional object of this invention to provide data handling techniques wherein different minimum-binary-digit codes are employed for data storage and for data processing respectively, the data storage code additionally being limited by the maximum permissible number of successive, like binary digits.

It is a further object of this invention to provide data handling techniques wherein the permissible low frequency response of the components employed may be higher than was heretofore possible, by limiting the maximum number of successive, like binary digits.

These and other novel features of the invention together with further objects and advantages thereof will become more apparent from the following detailed specification with reference to the accompanying drawings in which.

Figure 1:
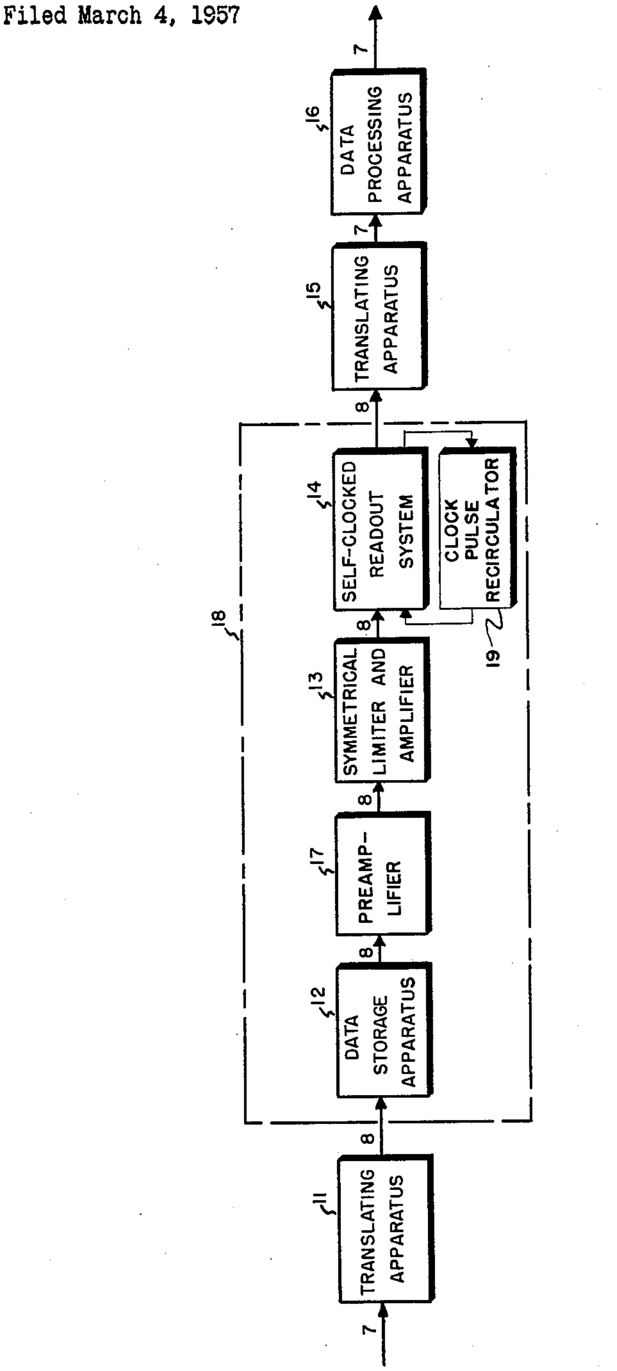
FIG. 1 is a schematic illustration of the apparatus employed.

In a preferred embodiment, referred to herein to illustrate the subject matter of the invention without limiting the scope thereof, 63 data characters are necessary to form all of the desired data words. The binary code employing the minimum number of bits which is capable of forming 63 unique combinations to represent each data character, is a code employing 6 bits per data character. Additionally, a parity check bit is adopted, such that all the bits of each data character plus its parity check bit add up to an odd number. Each data character can then be checked by adding up all of its bits. Accordingly, a code having at least 7 bits must be employed to represent each of 63 data characters uniquely. In this 7-bit code, the immediate succession of certain data characters may give rise to a sequence of as many as 12 like binary digits. As previously explained, where the data storage density is of the order of 1000 bits per inch and overlap of adjacent magnetized areas occurs, such a sequence imposes severe operational requirements on the data readout equipment. Additionally, it may seriously affect the reliability of the derived data where a self-clocked readout system is employed. To overcome these problems, the data storage density must either be diminished, or the number of successive like binary digits which may occur must be limited to a maximum consistent with the ability of the readout equipment to handle it reliably. In the preferred embodiment of the invention, it has been found that six like binary digits can be reliably read out in succession when data is stored at the aforesaid density of 1000 bits per inch. Accordingly, an 8-bit code is used for data storage, said code providing 63 unique combinations with the aforesaid limitation on the number of like successive bits. The adoption of this code permits the use of 63 unique combinations to represent each data character by equal numbers of ONE's and ZERO's. This condition provides a self-check which makes the addition of a separate check digit unnecessary.

It will be obvious that the capacity of a record of given length to store data characters will be smaller when an 8-bit code is used than when 7 bits per character are used, provided the storage density in bits per inch is the same in both instances. As mentioned above, the use of the 7-bit code for data storage, wherein as many as 12 successive like binary digits may occur, requires a decreased bit storage density if reliable data readout is desired. It has been found that, for a record of a given length, a greater data storage capacity coupled with reliable data readout can be obtained by the use of an 8-bit code, than is possible by the use of a 7-bit code at decreased storage density. Thus, in the present invention, an increase in the number of bits per data character makes it possible to obtain greater data storage capacity in a fixed length magnetic record, while maintaining reliable data readout therefrom.

With reference now to FIG. 1, a schematic representation of the apparatus used to carry out the principles of the present invention is illustrated. The data characters existing in the 7-bit data processing code are translated into the 8-bit data storage code by means of conventional translating apparatus 11 before being fed to data storage apparatus 12 which forms part of data storage system 18. The application of pulses to the magnetic storage medium of apparatus 12 magnetizes the medium according to the binary digits represented by the pulses. A comprehensive discussion of magnetic recording and its relation to the storage of signals on a magnetic surface is set out in the chapter entitled "Storage on a Magnetic Surface" in Digital Computer Components and Circuits, 1957 edition, by R. K. Richards, published by Van Nostrand. For a description of suitable data storage apparatus, see the co-pending application of Harrison W. Fuller et al., Serial No. 564,229 filed February 8, 1956. Upon readout from storage, the 8-bit coded data waveform is fed to a pre-amplifier 17, and is then symmetrically limited and amplified in the apparatus of block 13. A symmetrical limiter is sometimes known as a "double-ended limiter" or a "slicer" and a discussion of that device is given on pages 116 and 117 of Pulse and Digital Circuits, 1956 edition, by Millman and Taub, published by McGraw-Hill. Thereafter, it is fed to the self-clocked readout system of block 14, which is described in detail in the co-pending application referred to above. It will be noted that data is handled in the 8-bit code throughout the entire data storage system 18, the output of which is connected to a conventional code translating apparatus 15. The latter converts the data back into the 7-bit code. The translating apparatus represented by blocks 11 and 15 can, for example, be code converters of the type discussed in U.S. Patent No. 2,706,215. As shown in FIG. 1, the output of apparatus 15 is connected to a block 16 which schematically represents the data processing apparatus of the entire data processing system that utilizes data in the 7-bit code. Such data processing apparatus can, for example, be of the type described in the co-pending patent application of Thomas E. Lawrence, et al., Serial No. 601,921, filed August 3, 1956.

Figure 2:
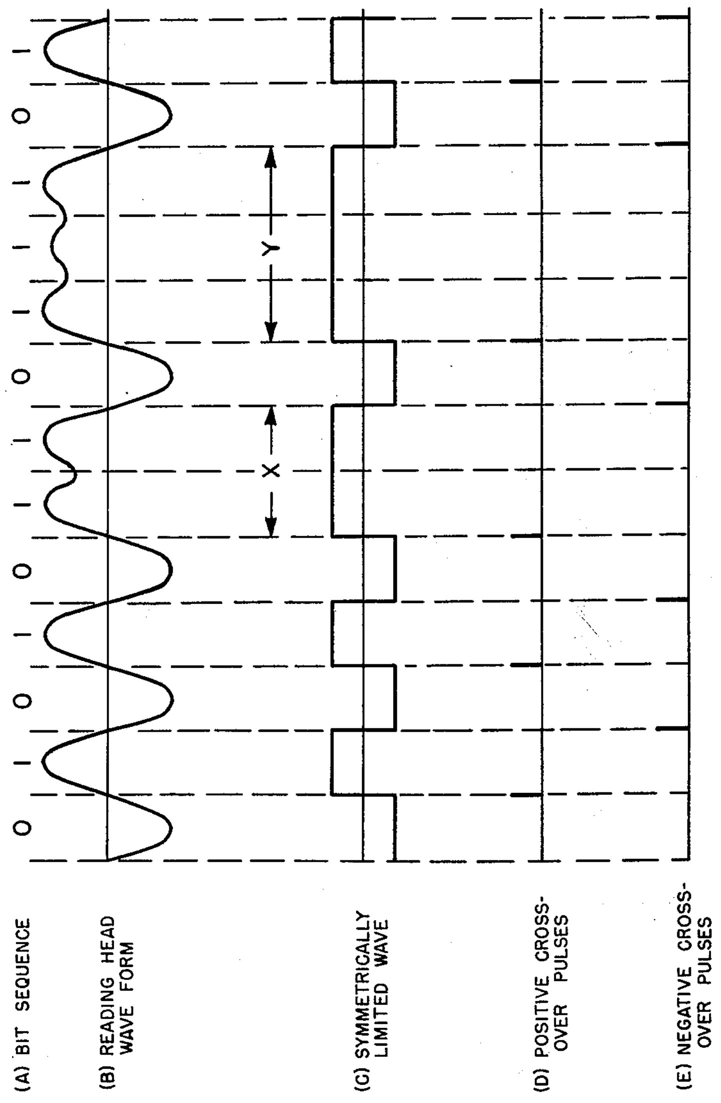
FIGS. 2A–2E illustrate some of the waveforms involved in the formation of clock pulses during self-clocked readout of the data storage apparatus of FIG. 1, which are necessary to form an understanding of the invention.

FIGS. 2A–2E inclusive, illustrate some of the waveforms involved in the above operation. FIG. 2A represents an exemplary bit sequence which is stored in the magnetic medium of the data storage apparatus 12, shown in FIG. 1. The waveform appearing at the output of the storage apparatus upon readout is illustrated in FIG. 2B, binary ONE's and ZERO's respectively, producing oppositely oriented magnetized areas in the medium. It will be noted that the amplitude of the waveform so read out does not return to zero between successive like binary digits, such as occur during intervals X and Y. FIG. 2C shows the symmetrically limited and amplified waveform of FIG. 2B, which appears at the output of the apparatus represented by block 13. As shown, a voltage of constant amplitude is obtained in regions X and Y.

The function of the self-clocked readout system 14, described in greater detail in the co-pending application referred to above, is to provide clock pulses for reading out each stored bit. In data storage apparatus where such a clock pulse is externally derived, e.g. from a separate clock track on the data storage medium, no reference need be had to the stored data. However, in high density magnetic data storage apparatus, particularly where a magnetic drum is used and the physical spacing between the clock track and the data track is substantial, the precise alignment with each other of the magnetic heads which serve respective data tracks poses a problem. In such a case, it is advantageous to use a self-clocked readout system where the clock pulses are derived from the stored data. In the instant embodiment, every time the symmetrically limited wave of FIG. 2C crosses the zero voltage line, a positive or a negative crossover pulse is formed as shown in FIGS. 2D and 2E, depending upon whether the symmetrically limited wave is going positive or negative. The clock pulses which are subsequently derived from selected crossover pulses, are used to sample the waveform and obtain a readout signal. In the absence of a crossover, such as in regions X and Y, the previously derived clock pulse is delayed one bit period and is thereafter recirculated to provide the clock pulse for reading out the next stored bit. The latter process is repeated until a clock pulse is again derived upon the occurrence of a crossover. The apparatus for recirculating the clock pulses is indicated by the block 19 in FIG. 1. The clock pulse recirculating apparatus may, in actuality, be an integral part of a self-clocked readout system, such as is shown in FIG. 4 of the aforementioned U.S. Patent No. 2,976,517. Inaccuracies introduced during repeated delays and recirculations of the clock pulse produce cumulative phasing errors due to the limitations of the equipment. These errors may bring about the loss of data. To prevent the latter situation from arising, the number of pulse recirculations must be limited by limiting the number of stored successive like binary digits. An excessively large sequence of the latter will also extend such regions as X and Y and will impose a severe low frequency response requirement on preamplifier 17. The following table illustrates the conversion from 6-bit to 8-bit code, which alleviates this condition:

*Conversion Table*

| CDEF | $AB_1$ | $AB_2$ | $AB_3$ | $AB_4$ |
|---|---|---|---|---|
| | 00 | 01 | 10 | 11 |
| 0000 | 01101010 | 10011010 | 01011010 | 11000011 |
| 0001 | 11000101 | 01000111 | 10000111 | 11000110 |
| 0010 | 11001010 | 01001011 | 10001011 | 11001001 |
| 0011 | 10001101 | 01001110 | 10001110 | 11001100 |
| 0100 | 11010010 | 01010011 | 10010011 | 11010001 |
| 0101 | 00010111 | 01010110 | 10010110 | 11010100 |
| 0110 | 00011011 | 01011001 | 10011001 | 11011000 |
| 0111 | 00011110 | 01011100 | 10011100 | 00011101 |
| 1000 | 11100010 | 01100011 | 10100011 | 11100001 |
| 1001 | 00100111 | 01100110 | 10100110 | 11100100 |
| 1010 | 00101011 | 01101001 | 10101001 | 11101000 |
| 1011 | 00101110 | 01101100 | 10101100 | 00101101 |
| 1100 | 00110011 | 01110001 | 10110001 | 01110010 |
| 1101 | 00110110 | 01110100 | 10110100 | 00110101 |
| 1110 | 00111001 | 01111000 | 10111000 | 00111010 |
| 1111 | 00111100 | 10100101 | 01100101 | ---------- |

The table gives the 8-bit code number for the equivalent 6-bit code number ABCDEF. Specifically, the AB digits of the 6-bit code number are found in line 1 of one of the columns labeled $AB_1$, $AB_2$, $AB_3$ and $AB_4$ respectively, while the remaining digits of the 7-bit code number are found in lines 2 to 17 inclusive, of column CDEF. The parity check bit which is appended to each of the 6-bit code numbers, but is not shown in the conversion table, is formed by adding either a binary 0 or a binary 1 to the number, such that the sum of the seven binary digits adds up to an odd number. For example, the parity check bit of the 6-bit code number which reads 000111 (column $AB_1$—line 1 and column CDEF—line 9), must be 0 in order for the digits to add up to an odd number, i.e. 3. The 7-bit number which includes the parity check bit, is then written as follows: 0001110. The 8-bit code number which corresponds to this 7-bit code number, is found from column $AB_1$—line 9 to be 00011110. It will be seen that there are equal numbers of 0's and 1's and hence, the 8-bit code number is self-checking. Similarly, the parity check bit of the 6-bit code number which reads 111010 (column $AB_4$—line 1 and column CDEF—line 12) is 1, so that the total number of digits of the 7-bit number 1110101 will add up to the odd number 5. The 8-bit code number corresponding to this 7-bit code number is found from column $AB_4$—line 12 to be 11101000. The number of 1's is again equal to the number of 0's and hence the number is self-checking. It should be noted that the 8-bit code with 63 used combinations contains a greater redundancy of information than the 7-bit code with an equal number of combinations. As a result, a more complete check is carried out than is possible with the parity check bit of the 7-bit code.

An inspection of the 8-bit code numbers will show that no more than 6 successive like binary digits may occur in any sequence. For example, the last recited 8-bit code number 11101000, if followed by the number 00011110 (column $AB_1$—line 9), will form a sequence of 6 binary 0's. Alternatively, in the 7-bit code as many as 12 successive like binary digits may occur, as evidenced by a succession of the following 7-bit code numbers which include the respective check digits: 1000000 (column $AB_3$—line 1 and column CDEF—line 2), and 0000001 (column $AB_1$—line 1 and column CDEF—line 2).

It will be apparent that the invention is not limited to the conversion from a 7-bit code to an 8-bit code and the subsequent reconversion to the 7-bit code. In accordance with the principles of the invention, it is only necessary to convert the data from a data processing code to a data storage code which utilizes more bits per data character than the data processing code, for the purpose of achieving greater data storage capacity with reliable data readout than is possible by using the original data processing code.

Having thus described the invention, it will be apparent that numerous modifications and departures as explained above, may now be made by those skilled in the art, all of which fall within the scope contemplated by the invention. Consequently, the invention herein disclosed is to be construed as limited only by the spirit and the scope of the appended claims.

What is claimed is:

1. In a data processing system which utilizes a predetermined number of different data characters to form desired data units, said data characters consisting of binary ONE and ZERO digits represented by electrical pulses or the absence thereof, apparatus for processing said data units in a first binary code, said first binary code comprising the minimum number of binary digits necessary to represent each of said data characters uniquely plus a parity check digit for each data character, a data storage system for handling said data in a second binary code, said data storage system comprising a high density magnetic storage medium for storing said data units, means for applying serial electrical pulses representative of said ONE and ZERO digits respectively, to produce oppositely oriented magnetized areas in said medium, said data storage system further including apparatus for reading said data units out of storage to obtain a data readout signal, said readout apparatus comprising means for obtaining a readout waveform, said readout waveform containing a polarity crossover corresponding to every succession of opposite binary digits, means for amplifying and amplitude-limiting said readout waveform, means for deriving a clock pulse upon the occurrence of each of said polarity crossovers, said clock pulses being used to sample said readout waveform to obtain said data readout signal, means for recirculating the last occurring clock pulse in the absence of a new clock pulse so derived, said second binary code comprising the minimum number of serially recorded binary digits necessary to represent each of said data characters uniquely while maintaining the number of successive like binary digits below a predetermined maximum, said maximum being determined by the limits of reliability of the data handling operation of said data storage system, said second binary code having a greater minimum number of digits per data character than said first binary code while providing increased data storage capacity of said magnetic medium consistent with said limits of reliable data handling, each of said data characters represented in said second binary code consisting of equal numbers of opposite digits to provide a self-check, the greater redundancy of information present in said second code providing a more complete check than is obtainable by the use of said parity check digit in said first code, first translating apparatus adapted to convert all data addressed to said data storage system into said second code, and second translating apparatus connected intermediate said data storage system and said data processing apparatus to convert all data addressed to the latter apparatus into said first code.

2. In a data processing system utilizing a predetermined number of different data characters to form desired words of data, said data characters being binarily encoded in the form of electrically represented ONE and ZERO digits, data processing apparatus for operating on said data words when each of said data characters is represented in a first binary code, said first binary code comprising the minimum number of binary digits necessary to uniquely represent each of said data characters plus a parity check digit for each data character, data storage apparatus for storing said data words in a second binary code, said second code having its digits stored in serial form and having the minimum number of binary digits necessary to uniquely represent each of said data characters while maintaining the number of successive, like binary digits below a predetermined maximum, each of the data characters represented in said second code comprising equal numbers of ONE and ZERO digits to provide a self-check, said minimum number of binary digits per data character of said second code being larger than the corresponding minimum number of said first code, the use of said second code providing a more complete check of each data character through a greater redundancy of information, first translating means connected to said data storage apparatus for translating the data addressed thereto into said second code, second translating means intermediate said data storage apparatus and said data processing apparatus for translating the data addressed to the latter apparatus into said first code, said data storage apparatus including a high density magnetic data storage medium wherein a transition between ONE and ZERO binary digits produces oppositely oriented magnetized areas in said medium, a readout circuit intermediate said data storage apparatus and said second translating means for obtaining a readout waveform corresponding to said stored data, said readout circuit further including means for deriving clock pulses upon the occurrence of polarity reversals in said readout waveform corresponding to a succession of opposite binary digits, said clock pulses being used to sample said readout waveform to obtain a readout signal, means for recirculating the last occurring clock pulse in the absence of a new clock pulse so derived, and the limits of reliable clock pulse recirculation determining the maximum permissible number of successive like binary digits.

References Cited in the file of this patent

UNITED STATES PATENTS

| | | |
|---|---|---|
| 2,700,155 | Clayden | Jan. 18, 1955 |
| 2,706,215 | Van Duuren | Apr. 12, 1955 |
| 2,807,004 | Pouliart et al. | Sept. 17, 1957 |
| 2,847,503 | Diamond | Aug. 12, 1958 |
| 2,861,258 | Walsh | Nov. 18, 1958 |
| 2,864,078 | Leader | Dec. 9, 1958 |
| 2,919,429 | Hamilton et al. | Dec. 29, 1959 |